Feb. 12, 1929. 1,702,185
C. WEBER
MACHINE FOR GLUING VENEER STRIPS AND SIMILAR WORK
Filed June 29, 1927 2 Sheets-Sheet 1

Inventor:
Carl Weber
By Dodge and Sons
Attorneys

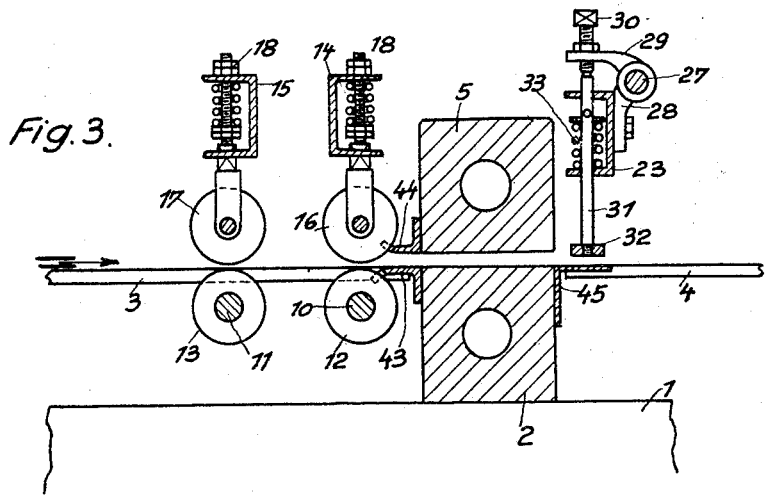
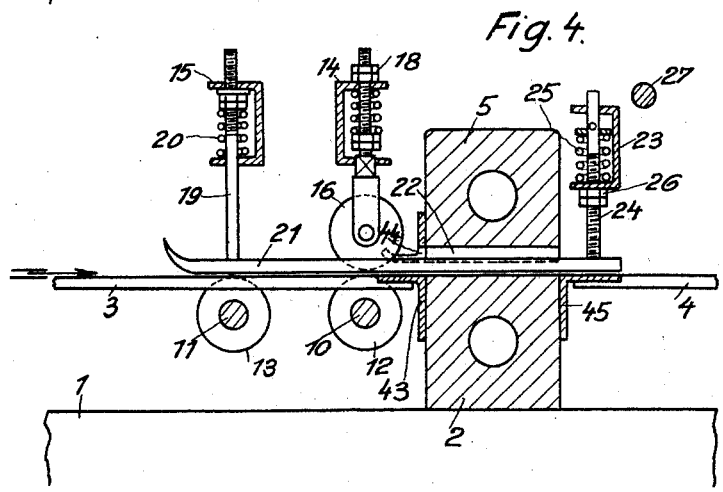
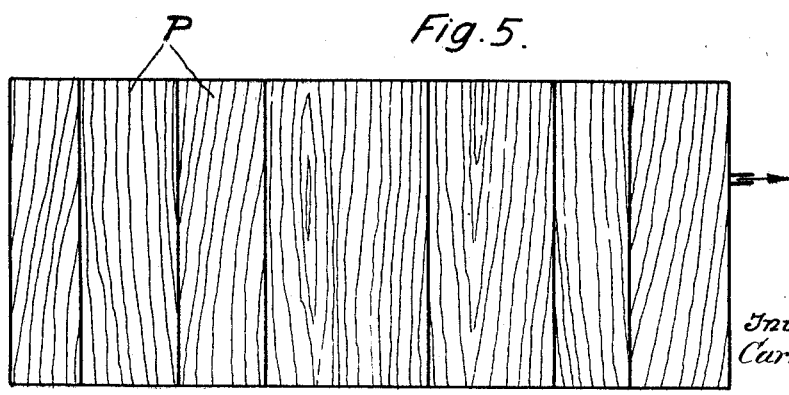

Patented Feb. 12, 1929.

1,702,185

UNITED STATES PATENT OFFICE.

CARL WEBER, OF GOPPINGEN, WURTTEMBERG, GERMANY.

MACHINE FOR GLUING VENEER STRIPS AND SIMILAR WORK.

Application filed June 29, 1927, Serial No. 202,358, and in Germany July 3, 1926.

My invention relates to a machine for gluing veneer strips edge to edge to form sheets of any desired length and similar work.

The chief object of my invention is to provide a machine of comparatively simple and efficient construction in which the glue-coated meeting edges to be joined in a continuous process are pressed into the same plane and against each other throughout the length of the joint prior to the setting of the glue so that they will accurately register and be in intimate contact with each other. To this end I provide in the surface of the table or support on which the strips are continuously fed in succession towards and through the operating parts of the machine, a plurality of feeding devices in sets, one set behind the other one, and positive driving means for imparting to the first or front set of feeding devices a greater feeding speed than to the following feeding devices.

A further object of my invention resides in the provision of suitable pressure bodies or means behind the feeding mechanism and means for heating said pressure bodies which may be shaped to form hollow bodies acting in the manner of a presser-foot, to stop the feeding motion of the strips to allow the glue to set and press the edges to be joined into a perfect plan.

A further object of my invention resides in the provision of clamping means behind said pressure bodies, said clamping means going up and down together with the upper-pressure body, but somewhat in advance of the pressure body, in order to stop the motion of the veneer sheet and causing the feeding means, before the pressure bodies engage the sheet, to tighten once more the joint of following veneer strips when between the pressure bodies.

With the above recited and other objects in view, reference is had to the following specification and drawings in which there are exhibited three examples or embodiments of the invention which are in no way intended as a limitation upon the scope of the appended claims as it is to be clearly understood that variations and modifications which fairly fall within the true scope of said claims may be resorted to when found expedient.

In the accompanying drawings forming a part of this specification and showing, as above intimated, for purposes of example, a preferred form and manner in which the invention may be embodied and practised, but without limiting the claimed invention to such illustration instances.

Figure 3 is a vertical section taken on the line III—III in Figure 2, and Figure 4 is a vertical section taken on the line IV—IV in Figure 2;

Figure 5 shows a length of a veneer sheet with the longitudinal edges of the strips glued together.

Figure 1:
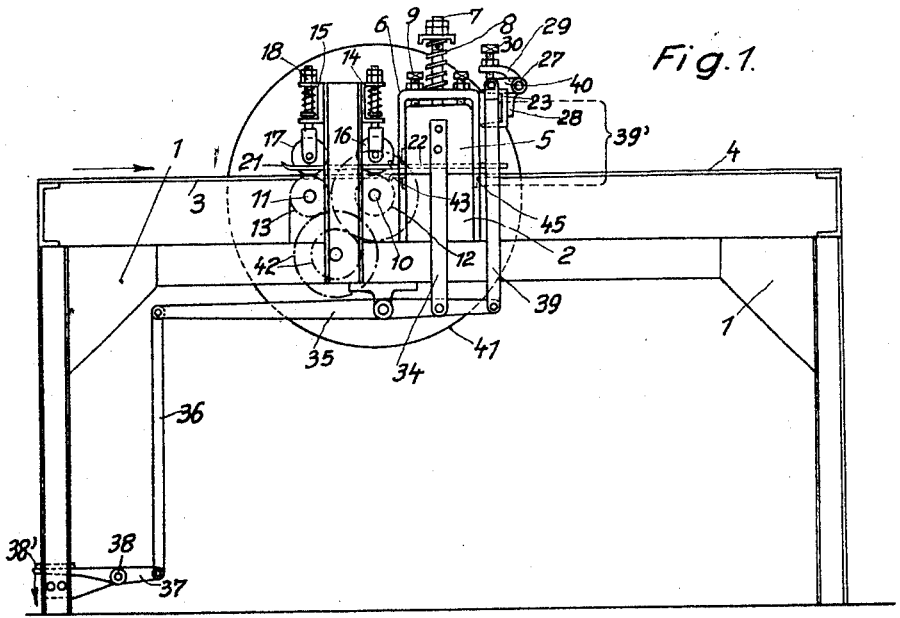
Figure 1 represents a side view of the machine.
Figure 2:
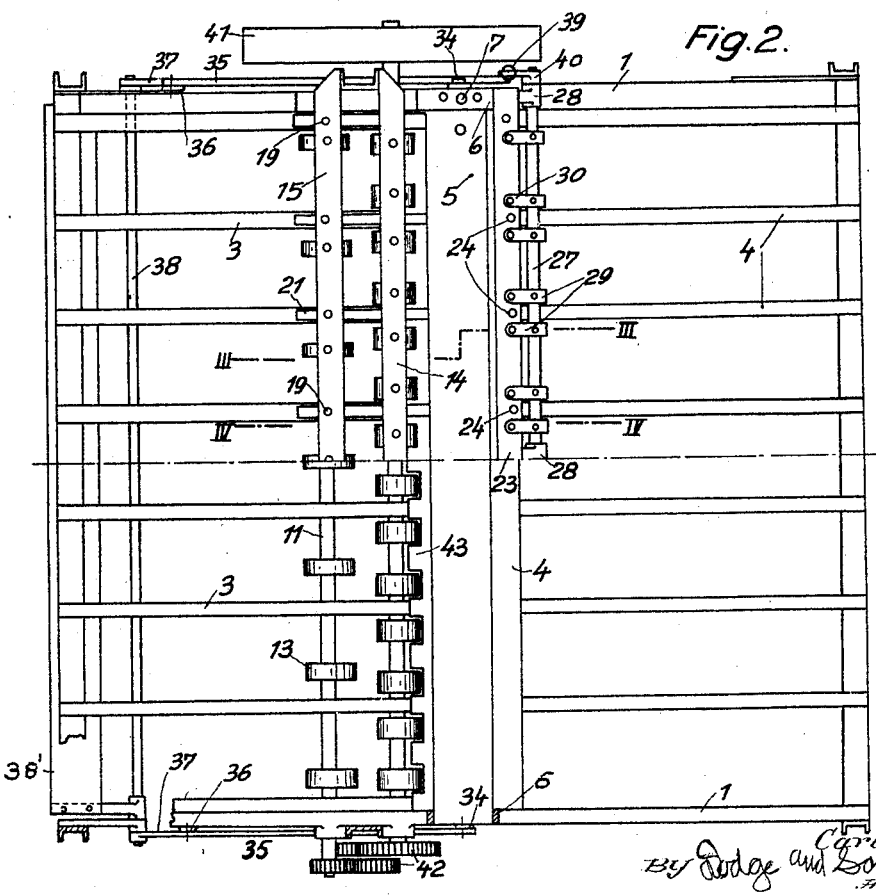
Figure 2 represents the machine in a plan view with the operating parts above the feeding table or support shown on the side thereof only while those in the remaining area of the machine are not shown for clearness sake.

Before proceeding to describe the illustrated embodiments of my invention I wish to have it understood that the single veneer strips employed for constituting a sheet may be of rectangular or approximately rectangular shape as shown in Figure 5, but also strips of somewhat irregular shape may be used. Thus for instance strips of trapezoidal shape may be employed by joining the non-parallel edges thereof whilst the parallel edges are placed in staggered relationship or alternately as regards alinement that is, a longer edge following a shorter one. The strips of the continuous sheet shown in Figure 5 are glued edge to edge lengthwise.

I shall now proceed to describe the machine as constructed for use in making sheets of wood veneer of the kind shown in Figure 5. The machine has a frame 1. Mounted on the frame 1 is a hollow pressing and heating body 2 which is rigidly connected with the frame, and a number of bars 3 are provided in front of the body 2 to constitute a kind of a table or support. The work or strips of veneer are supplied to the table or support and moved thereon in the direction of the arrow in Figures 1, 3, 4. Similar bars 4 are provided in the rear of the body 2 for delivery purposes and both the bars 3 and the bars 4 are situated in the level of or flush with the upper surface of the body 2. It goes without mentioning that continuous supporting surfaces or tables may be substituted for the bars 3 and 4 if desired.

Above and in vertical alinement with the body 2 there is another hollow pressure and heating body 5 which is hung upon rods 7 in a yoke-shaped guiding bracket 6 so as to be movable therein vertically against the action of springs 8 coiled about the rods 7. The springs 8 tend to raise the body and hold the same in its uppermost position limited by adjusting screws 9. In front of the cooperating heating bodies 2 and 5 a little distance below the bars 3 two shafts 10 and 11 are mounted in suitable bearings of the frame 1 so as to extend over the whole length of the machine, and a number of rolls 12 and 13 are keyed to the said two shafts respectively. Above and in vertical alinement with the rolls 12 and 13 cross-beams 14 and 15 are mounted on the frame 50 so as to extend over the whole width of the machine and rolls 16, 17 are yieldingly suspended to the beams and adapted to be adjusted in vertical direction by means of nuts 18. It will be seen, that the rolls 16 and 17 are situated in vertical alinement with the cooperating rolls 12 and 13.

Hung upon the cross-beam 15, by means of rods 19 and springs 20, are guiding rails 21 which extend above and in the direction of the bars 3 and through recesses 22 of the upper heating body 5, see Figure 4, to overlie the inner ends of the bars 4. The overlying extremities or rear ends of the rails 21 are yieldingly suspended, by means of rods 24 and springs 25, to a cross-beam 23, so that the rails 21 are located parallel to but spaced apart from the upper surface of the stationary heating body 2 and adapted to be adjusted in vertical direction by means of nuts 26 on the threaded rods 24. Brackets 28 firmly connected with the cross-beam 23, are shaped to form suitable bearings for a shaft 27 having arms 29 with adjusting screws 30, see Figure 3, for springs 33 coiled about the rods 31 guided in holes of the cross-beam 23. The lower ends of the rods 31 are connected in pairs by a presser-foot 32, and it will be seen, that the springs 33 act to normally hold the rods in contact with the adjusting screws 30 of the arms or levers 29, as shown in Figure 3.

The upper heating body 5 is connected, at its two ends, with levers or arms 37 of a shaft 38 extending over the whole width of the machine and duly supported in suitable bearings of the frame-work and this connection is pivotally accomplished by means of pull-rods 34, two-armed levers 35 fulcrumed in suitable brackets integral with the frame 1 and connecting rods 36, as will be readily seen in Figure 1. The shaft 38 is equipped with a pedal 38' and the inner ends of the two-armed levers 35 are pivotally connected by means of a rod 39 with arms 40 rigidly connected with the aforesaid shaft 27, the two pull-rods 39 are provided each with a resilient equalizing portion, as indicated at 39' in Figure 1, so as to be variable in length to a certain degree.

Keyed to the shaft 10 is a belt-pulley 41 for the transmission of power to the shaft from any suitable source of energy, and the opposite end of the shaft is positively connected with the shaft 11 by means of a suitable toothed gearing 42 to cause the shaft 11 to revolve at a greater speed of a predetermined ratio than the shaft 10.

On the front faces of the two heating bodies 2 and 5 angle bars 43 and 44, respectively are provided and shaped to form a flaring opening for the reception of the incoming strips. The bars are recessed for the accommodation of the pairs of rolls 12 and 16 and extend over the whole width of the machine, the lower bars 43 serving at the same time as a means for connecting the bars 3 therewith and with the heating body 2. At the rear face of the stationary heating body 2 a similar angle bar 45 is firmly connected with the latter and with the bars 4 so as to form a strong solid base, support or abutment against the pressure exerted by the pressure-foot 32 onto the strips of veneer. In case, however, that the machine is equipped with regular supporting tables in lieu of the system of bars 3 and 4 the angle bars 43 and 45 may be dispensed with.

I prefer to heat the hollow bodies 2 and 5 with steam in any appropriate manner and I deem it unnecessary to explain the means for supplying steam to the bodies since they may be of any conventional construction and arrangement and if desired, electrical heating means may be substituted therefor which are likewise universally known, such as heating coils adapted to be inserted into the hollow bodies 2 and 5 or heating plates to be placed at the bottom of the body 5 or on the top of the body 2.

The operation of the machine described with reference to Figures 1 to 4, is as follows:

After two strips of veneer have had glue applied to the edges to be joined, the same are laid upon the bars 3 and shifted by the operator towards the rolls 13 and 17 which then act to grip the strips and feed the same toward and to the pair of rolls 12 and 16. Each following strip takes the same way and the meeting edges of the successive strips are pressed against each other throughout the length of the joint so that there will be no free space at the joint and the contiguous edges are in intimate contact with the glue therebetween when they arrive between the rolls 12 and 16. During the travel of the strips over the bars 3 and the heating body 2 the guiding rails 21 prevent the front edges of the strip from turning up or overlapping the preceding strip, since the said rails are to be adjusted for the purpose so that the strips will encounter and have to overcome a certain frictional resistance to the effect of ensuring the meeting edges of the strips to accurately coincide and register throughout the whole length of the joint. As regards the pressure exercised by the resilient top rolls 17, the latter are to be adjusted to allow the positively driven bottom rolls 13 to slide on the bottom face of the strip so as to counteract or balance the difference in speed of the several bottom rolls 12 and 13. Moreover, the yielding pressure of the rolls 16 and 17 is to be regulated with accuracy to not allow the bottom rolls 12 and 13 to break a strip, due to the feeding pressure, at times when the sheet or the interconnected strips have come to a standstill by means of the presser foot 32 and the heating bodies 2, 5.

At the time the joined edges of two contiguous strips occupy a position between the two heating bodies 2 and 5, the operator presses down the pedal 38' in order to lower the upper-heating body 5 and to produce an even pressure on the glue-coated and joined edges and the duration of such pressure may vary in accordance with the thickness of the veneer strips and the kind of wood or glue used. The pressing operation obviously will stop the movement of the sheet and the rolls 12 and 13 will slide on the bottom face of the strip or strips until the operator releases the pedal 38'.

By lowering the upper heating body 5, as above described, the shaft 27 will be positively turned so as to lower the presser-foot 32 at the same time, the leverage of the system of rods and levers provided for the purposes being such that the presser-foot 32 will go down in advance of the heating body 5. Hence it results that just prior to the setting of the glue the veneer strips firmly arrested by the presser-foot 32, will be forcibly compressed once more edge to edge by the feeding pressure of the rolls 12 and 13 and a smooth, accurate joint will be produced ere the glue is caused to set, under heat and pressure. The equalizing portion 39' inserted into the pull-rod 39 involves the advantage of permitting the heating body 5 to continue its downward movement after the presser-foot 32 has been fully lowered to rest on the sheet with heavy pressure. When the pedal 38' is released the springs 8 and 33 will act to raise the heating body 5 and the presser-foot 32 and return the same to their normal positions whereby the sheet of veneer strips will also be released for the next feeding movement. The operations above described are repeated as often as the operator inserts a further veneer strip into the machine and cause the same to be glued edge to edge to the preceding strip, by pressing the pedal.

I have not attempted to explain all of the minute details of the construction of the machine for it will be understood by those to whom this specification is addressed, that the parts will be of the proper size and relationship and will be properly mounted and supported according to the tenets of machine construction.

In reducing my invention to practice I find that the embodiment thereof herein shown and described is most efficient, but realizing that certain conditions will necessarily vary in concurrence with the adoption of my machine, I desire to emphasize the fact that various minor changes in the details of construction and in the proportion of parts may be resorted to when required, without sacrificing any of the advantages of my invention as defined in the appended claims.

What I claim is:

1. A machine for gluing wood veneer strips edge to edge to form sheets of any desired length, comprising a support for the strips to move on, power-actuated means for feeding the strips in succession over said support, heated pressure bodies arranged after said feeding means and clamping means after these pressure bodies temporarily moving up and down with the upper pressure body, but somewhat in advance of it to cause the feeding means to tighten the joint of the veener strips just in vertical alinement with the pressure bodies.

2. A machine for gluing wood veneer strips edge to edge to form sheets of any desired length, comprising a support for the strips to move on, power-actuated means for feeding the strips in succession over the said support, heated pressure bodies arranged after said feeding means and clamping means after these pressure bodies temporarily moving up and down with the upper pressure body, but somewhat in advance of it, the upper idler rolls of said feeding means contacting the veneer strips with yielding pressure to enable the lower power actuated feeding rolls to slide on the bottom surface of the veneer strips if necessary.

3. A machine for gluing wood veneer strips edge to edge to form sheets of any desired length, comprising a support for the strips to move on, yielding power actuated means for feeding the strips in succession over the said support, heated pressure bodies arranged after said feeding means and clamping means after these pressure bodies temporarily moving up and down with the upper pressure body, but somewhat in advance of it, a common linkage for moving said upper pressure body and said clamping means, equalizing means being inserted in this linkage before the clamping means.

4. A machine for gluing wood veneer strips edge to edge to form sheets of any desired length, comprising a support for the strips to move on, power actuated means for feeding the strips in succession over said support, and gripping means operated intermittently and acting to join the meeting glue-coated edges of successive strips and to cause the glue to set under heat and pressure, said feeding means sliding on the surface of said strips while being temporarily stopped by said heating and pressing means.

5. A machine for gluing wood veneer strips edge to edge to form sheets of any desired length, comprising a support for the strips to move on, two sets of rolls feeding the strips in succession over said support, the first set of rolls running at a faster speed than the second set of rolls and means adapted to press the glue coated edges of successive strips and to cause the glue to set under heat and pressure, said feeding rolls acting on the strips with yielding pressure to enable the rolls to slide on the surface of the strips when running faster than the strips.

6. A machine for gluing wood veneer strips edge to edge to form sheets of any desired length, comprising a support for the strips to move on, power actuated means for feeding the strips in succession over said support, and heated pressure bodies arranged after said feeding means, the upper one of these bodies temporarily moving up and down to stop the veneer sheet and causing the glue to set under heat and pressure, said feeding means acting on the strips with yielding pressure to enable these means to slide on the surface of the strips when running faster than the strips.

In testimony whereof, I have signed my name to this specification this 18th day of June, 1927.

CARL WEBER.